United States Patent
Kuemmlee et al.

(10) Patent No.: US 6,933,647 B2
(45) Date of Patent: Aug. 23, 2005

(54) SQUIRREL-CAGE ROTOR FOR AN ASYNCHRONOUS INDUCTION MOTOR

(75) Inventors: Horst Kuemmlee, Berlin (DE); Holger Henning, Berlin (DE)

(73) Assignee: Siemens Aktiengesellschaft, München (DE)

( * ) Notice: Subject to any disclaimer, the term of this patent is extended or adjusted under 35 U.S.C. 154(b) by 179 days.

(21) Appl. No.: 10/362,621

(22) PCT Filed: Aug. 15, 2001

(86) PCT No.: PCT/DE01/03093

§ 371 (c)(1),
(2), (4) Date: Apr. 3, 2003

(87) PCT Pub. No.: WO02/17461

PCT Pub. Date: Feb. 28, 2002

(65) Prior Publication Data

US 2004/0012293 A1 Jan. 22, 2004

(30) Foreign Application Priority Data

Aug. 23, 2000 (DE) .......................... 100 43 329

(51) Int. Cl.⁷ .............................................. H02K 17/16
(52) U.S. Cl. ................................. 310/211; 310/156.78
(58) Field of Search ................................ 310/210, 211, 310/212, 213, 156.78, 156.83

(56) References Cited

U.S. PATENT DOCUMENTS

| | | | | |
|---|---|---|---|---|
| 1,011,944 A | * | 12/1911 | Gray | 310/211 |
| 2,010,869 A | * | 8/1935 | Lilja | 318/750 |
| 2,421,860 A | | 6/1947 | Winther | 310/211 |
| 3,113,229 A | * | 12/1963 | Jacobs | 310/105 |
| 3,705,971 A | | 12/1972 | Jacovides et al. | 219/121.14 |
| 5,185,918 A | * | 2/1993 | Shafer, Jr. | 29/598 |
| 5,719,457 A | * | 2/1998 | Helfer | 310/211 |
| 5,986,366 A | * | 11/1999 | Bailey et al. | 310/52 |

FOREIGN PATENT DOCUMENTS

| | | |
|---|---|---|
| DE | 23 62 195 A1 | 5/1975 |
| DE | 25 37 706 B2 | 3/1976 |
| DE | 197 29 432 C1 | 1/1999 |
| GB | 1 129 064 A | 10/1968 |
| GB | 1 427 818 A | 3/1976 |
| JP | 55 141945 A | 6/1980 |

\* cited by examiner

*Primary Examiner*—Dang Le
(74) *Attorney, Agent, or Firm*—Henry M. Feiereisen

(57) ABSTRACT

The novel squirrel-cage rotor should enable a power output of the motor of more than 1 MW even at rotation speeds of more than 10,000 rpm. To this end, the conductor bars (4) of the squirrel cage are soldered into slots (8, 9) arranged on the periphery of the massive rotor core (3) across their entire length, and the conductor bars are arranged to be flush with the surface (13) of the rotor core (3).

5 Claims, 3 Drawing Sheets

SQUIRREL-CAGE ROTOR FOR AN ASYNCHRONOUS INDUCTION MOTOR

BACKGROUND OF THE INVENTION

The invention relates to the field of dynamoelectric machines and is applicable for the constructive configuration of the rotor of an asynchronous induction motor which has windings configured as conductor bars and short-circuited by end rings.

A conventional asynchronous machine of this type has a rotor core of massive steel whereby the rotor surface facing the air gap is formed with slots which have slot walls respectively converging outwardly in radial direction. The winding associated to the rotor is configured as squirrel-cage winding and is made of metallic conductor bars which are arranged form-fittingly in the rotor slots. The portions of the metallic conductor bars, disposed outside the laminated core of the stator, form together an assembled ring-shaped winding part, whereby these portions are suitably welded together. As the conductor bars are configured as U-shaped bars, with each U-leg filling half of a rotor slot, the squirrel-cage winding projects partly into the magnetic air gap (DE 2 537 706 B1).

The rotor core of another known asynchronous machine is made of metal sheets provided with recesses for receiving conductor bars. The conductor bars have ends associated to short-circuit rings which are soldered to the ends of the conductor bars (DE 2 362 195 A1).

In order to achieve an asynchronous machine of great power and high operating speed, a rotor construction is further known having a rotor core made of metal sheets and associated to a pre-fabricated squirrel cage which is made of two half-cages with attached short-circuit rings which are welded or soldered together approximately in the area of half the length of the short-circuit rotor. Suitably, capping retaining rings of high-strength, non-magnetic material are hereby additionally placed over the short-circuit rings (DE 197 29 432 C1).

SUMMARY OF THE INVENTION

Starting from a squirrel-cage rotor for an asynchronous induction motor having a rotor core made of massive steel and formed integrally with a rotor shaft, wherein the rotor core is provided with slots extending in axial direction, and conductor bars disposed in the slots and conforming to the slot cross section, wherein the conductor bars have ends, each of which being short-circuited by a short-circuit ring by means of a material-interconnecting fit, the invention is based on the object to provide a squirrel-cage rotor which allows operation at a power output of the motor of more than 1 MW, even at rotation speeds of more than 10,000 rpm and thus circumferential velocities of more than 200 m/sec, and yet is easy to manufacture.

This object is attained in accordance with the invention by providing the slots with parallel or substantially parallel slot walls, and by soldering the conductor bars over their entire length into the slots, with the conductor bars arranged flush with the surface of the rotor core.

A squirrel-cage rotor configured in this manner is characterized by a cage having in radial direction a small structural height. As a consequence, the rotor shaft can have a greater diameter, when compared to rotors that have a same outer diameter and a short-circuit cage of greater structural height, so that a stiffer rotor construction and thus less tendency to vibrate at high rotation speeds is realized. As the conductor bars are arranged flush with the surface of the rotor—for example, by applying a material-removing process—the squirrel-cage rotor has a smooth surface and thus very small friction losses. The soldering process, required to secure the conductor bars in the slots of the rotor core, can easily be implemented. In order to introduce solder into the joint area, it is recommended to provide the conductor bars with an elongate channel in the area confronting the slot base for introducing the solder material before the conductor bars are placed into the slots. The channel may have a circular configuration for receiving a round solder wire. As an alternative, the rod-shaped or wire-shaped solder material may initially be placed into the respective slot, and subsequently the conductor bar with the channel are put over the solder material.

The association of the short-circuit rings to the conductor bars, soldered into the slots of the rotor core, can be realized in accordance with a further development of the invention by conically tapering the rotor core and the conductor bars at the ends of the rotor core, i.e. in the inactive zone of the short-circuit rings, and by soldering to the tapered region a short-circuit ring which on the inside is also conically tapered. In such a configuration, the short-circuit ring projects only slightly beyond the diameter of the rotor core, whereby the short-circuit ring—depending on the inclination of the conical taper—is connected across a large area with the conductor bars. In addition, this measure evens out the current distribution in the cross section of the short-circuit ring, furthermore, differences in heat expansion between rotor core and the short-circuit ring during the soldering process can be compensated through axial displacement of the short-circuit ring.

Instead of using a discrete short-circuit ring, it is also possible to realize the electrically required short circuiting in the area of the ends of the conductor bars, which are shorter than the rotor core, by providing two ring grooves whereby in the area of each of the ring grooves two neighboring conductor bars are soldered together via an inserted intermediate piece.

BRIEF DESCRIPTION OF THE DRAWING

Two exemplified embodiments of the novel squirrel-cage rotor are illustrated in FIGS. 1 to 5, wherein.

DETAILED DESCRIPTION OF PREFERRED EMBODIMENTS

Figure 1:
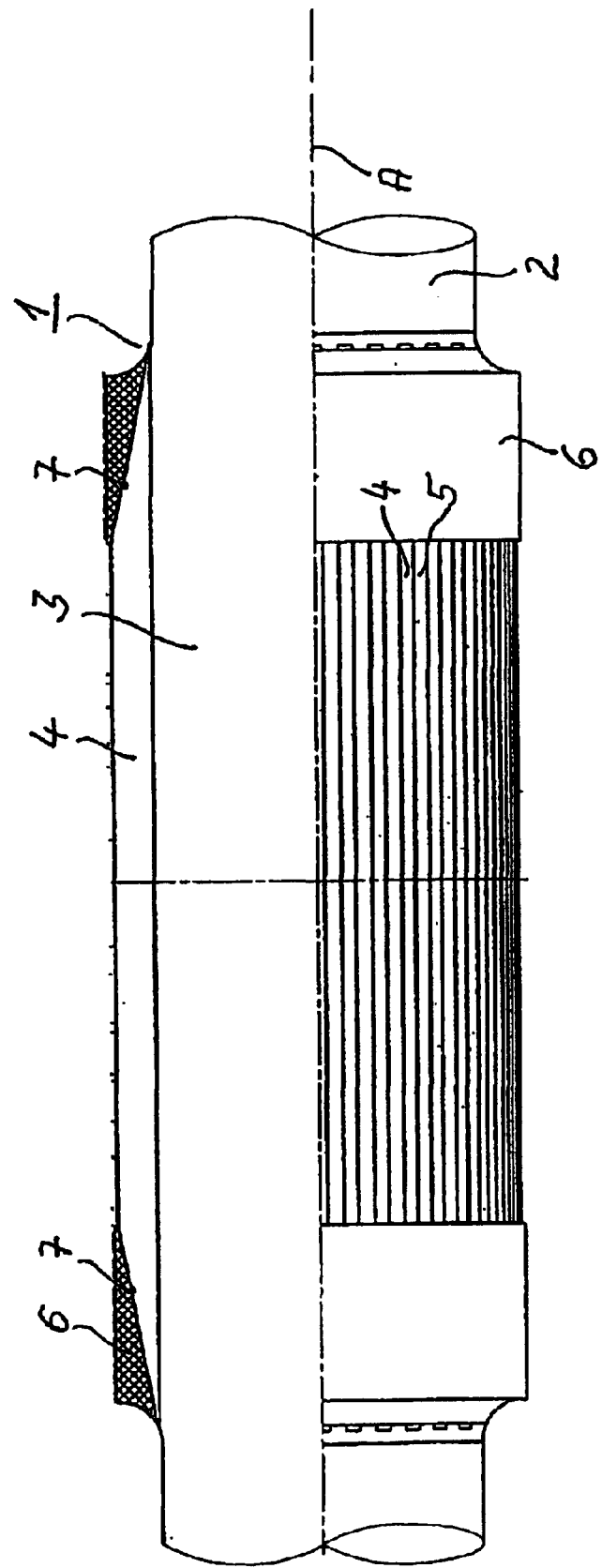
FIG. 1 shows a squirrel-cage rotor with conically tapered ends of the conductor bars at the ends of the rotor core.

FIG. 1 shows the essential area of the squirrel-cage rotor of an asynchronous machine, whereby the lower part of the illustration depicts a plan view and the upper part of the illustration depicts a longitudinal section. The squirrel-cage rotor is made of massive steel and has a shaft 2 defined by the axis A and merging into a rotor core 3. The rotor core is selected with an outer diameter which is greater than the diameter of the shaft 12. Formed into the rotor core are axial slots, with webs 5 provided between the slots, wherein conductor bars 5 are inserted in the slots and configured flush with the surface of the rotor core by a finishing process.

Both end zones of the webs 5 and the conductor bars 4, placed in the slots of the rotor core, are conically tapered to thereby realize conical regions 7 which taper toward the rotor axis. Placed over each of both regions 7 is a short-circuit ring 6. According to FIG. 2, the outer diameter $D_R$ of the short-circuit rings is selected slightly greater than the outer diameter $D_K$ of the rotor core. The inclination of the conical taper is designated by the angle $\alpha$, which is approximately 20°.

Figure 3:
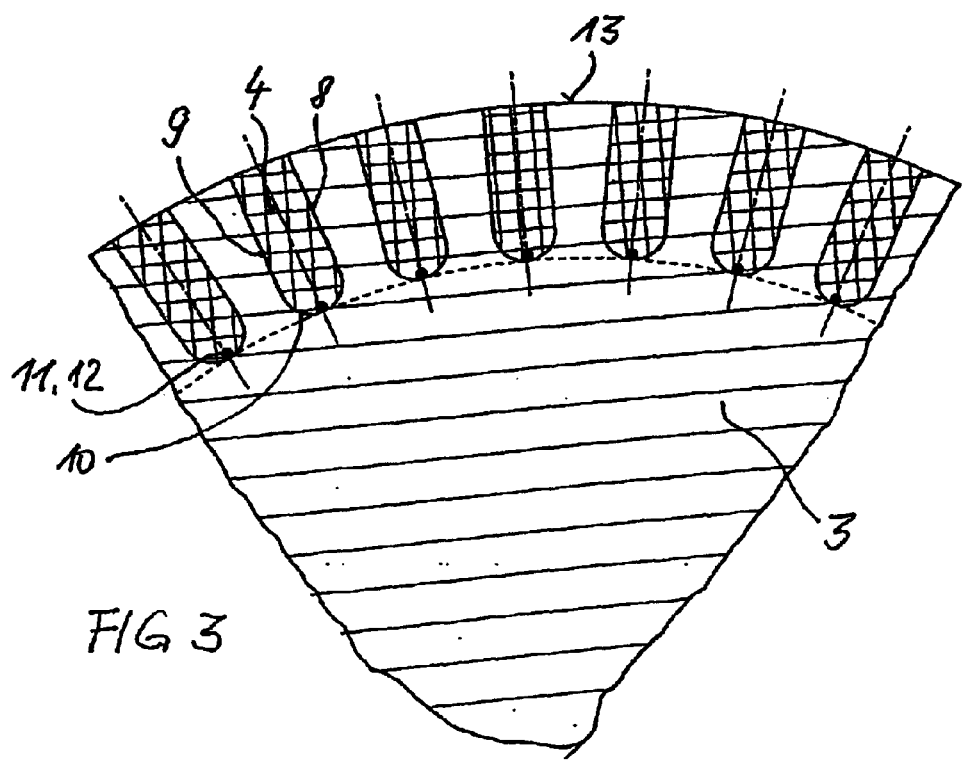
FIG. 3 shows a cross sectional view of slots and conductor bars according to FIG. 1.

According to FIG. 3, the slots formed in the rotor core 3 are so configured as to include parallel slot walls 8 and 9 and to have a concave slot base 10. The conductor bars placed into the slots conform to the slot cross section, and each of the conductor bars has in the convex region, which complements the concave configuration of the slot, a channel 11 extending in longitudinal direction of the conductor bar for introduction of the solder material 12. As the rotor core is heated, this solder material is caused to melt so that the conductor bars 4 are soldered in finished state in full contact in the slots.

The short-circuit rings 6, placed over the tapered ends of the conductor bars and the rotor core are also connected with the ends of the conductor bars and the slanted webs of the rotor core through a material-interconnecting fit, especially through soldering.

Figure 2:
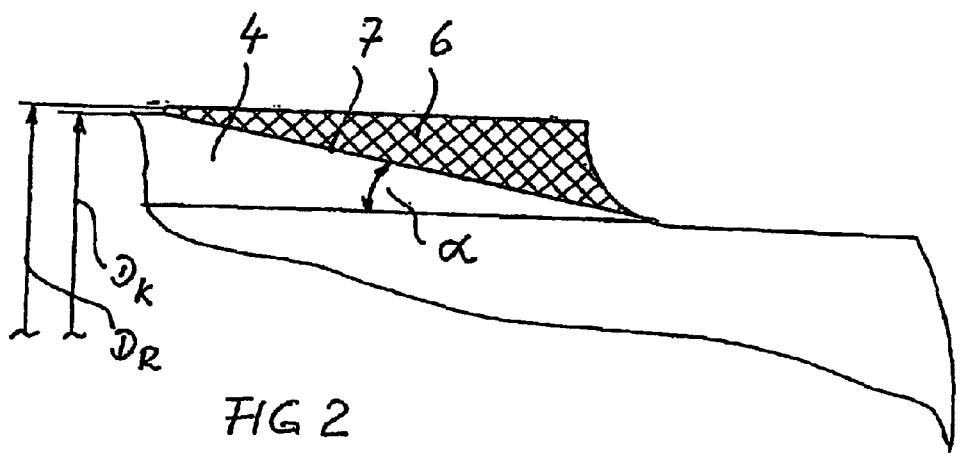
FIG. 2 shows a detailed view of the association of conductor bars and short-circuit ring according to FIG. 1.
Figure 4:
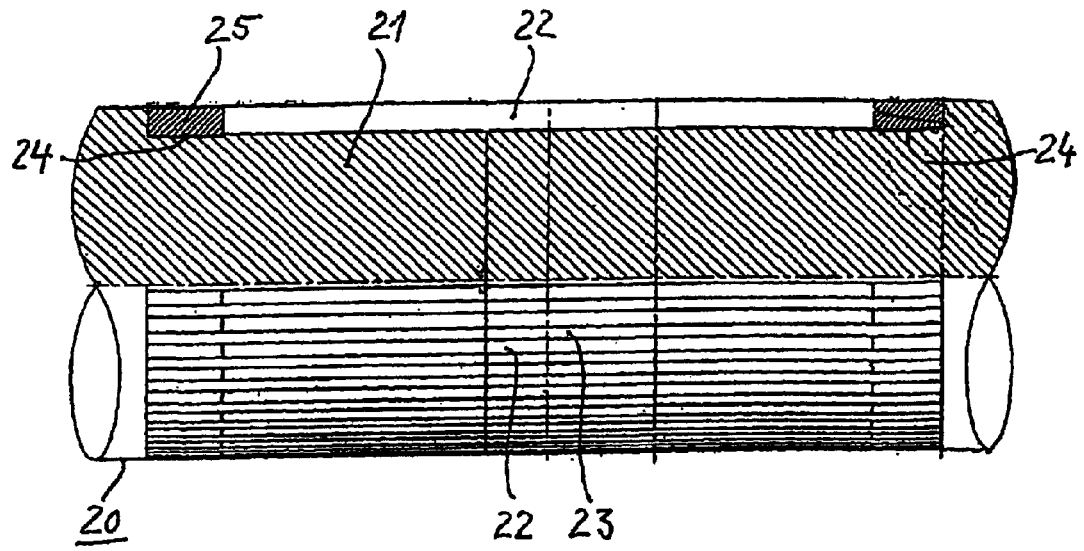
FIG. 4 shows a squirrel-cage rotor with short-circuit rings inset in the surface area of the rotor core.
Figure 5:
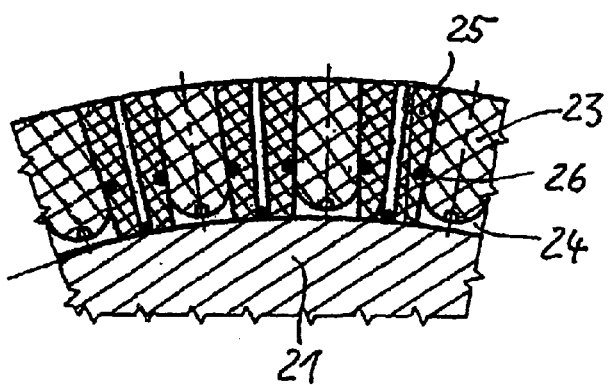
FIG. 5 shows a cross section of the configuration of the short-circuit ring according to FIG. 4.

In the exemplified embodiment of a squirrel-cage rotor 20 according to FIGS. 4 and 5, the rotor core 21 is also provided with slots which extend in longitudinal direction and between which webs 23 are formed. These slots are recessed into the surface of the rotor core. Conductor bars 23 are placed in these slots. Both ends of the slots have each an additional ring-shaped groove 24 so that the webs 22 are shortened on both ends. Placed in the regions between the webs 22 and the annular grooves 24 are intermediate pieces 25 of a same material as the conductor bars, in particular copper. These intermediate pieces form together with the ends of the conductor bars both short-circuit rings. Intermediate pieces and ends of the conductor bars are also connected to one another through a soldering process in a material-interconnecting manner. Hereby, the intermediate pieces according to FIG. 2 are provided with lateral channels 26 for introduction of soldering material. The conductor bars 23 are configured in a same manner and the conductor bars 4 according to FIG. 2.

What is claimed is:

1. A squirrel-cage rotor for an asynchronous induction motor of greater power, comprising a rotor core made of massive steel and formed integrally with a rotor shaft, said rotor core having a surface formed with slots extending in axial direction and having parallel or substantially parallel slot walls; and conductor bars disposed in and soldered along their entire length into the slots in one-to-one correspondence such as to extend flush with the surface of the rotor core, wherein each of the conductor bars has a cross section conforming to a cross section of the corresponding slot and having opposite axial ends; and a short-circuit assembly having two short-circuit rings, one short-circuit ring short-circuiting the one of the opposite axial ends of the conductor bars, and the other short-circuit ring short-circuiting the other one of the opposite axial ends of the conductor bars by a material-interconnecting fit, wherein the rotor core has opposite ends, each said end of the rotor core and each said end of the conductor bars being conically tapered so that adjacent ends of the rotor core and the conductor bars define opposite tapered regions, wherein the short-circuit rings are conically tapered on the inside and soldered onto the tapered regions.

2. The squirrel-cage rotor of claim 1, wherein the rotor core is provided in an end zone of each of the conductor bars with an annular groove, with the one axial ends of the conductor bars being soldered together via intermediate pieces placed into the annular groove at one end zone of the rotor core, and the other axial ends of the conductor bars being soldered together via intermediate pieces placed into the annular groove at the other end zone of the rotor core.

3. The squirrel-cage rotor of claim 1, wherein each of the conductor bars is provided in an area facing a slot base with an elongate channel for receiving solder material.

4. The squirrel-cage rotor of claim 3, wherein the slot base of each slot has a concave configuration.

5. The squirrel-cage rotor of claim 3, wherein the channel has a circular configuration for receiving solder material in the form of a round solder wire.

* * * * *